(12) United States Patent
Myojo et al.

(10) Patent No.: US 10,753,295 B2
(45) Date of Patent: Aug. 25, 2020

(54) CONTROLLER FOR INTERNAL COMBUSTION ENGINE AND METHOD FOR CONTROLLING INTERNAL COMBUSTION ENGINE

(71) Applicant: TOYOTA JIDOSHA KABUSHIKI KAISHA, Toyota-shi, Aichi-ken (JP)

(72) Inventors: Keiichi Myojo, Okazaki (JP); Yuki Nose, Kasugai (JP); Eiji Ikuta, Oobu (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/058,127

(22) Filed: Aug. 8, 2018

(65) Prior Publication Data

US 2019/0048815 A1 Feb. 14, 2019

(30) Foreign Application Priority Data

Aug. 10, 2017 (JP) ................................ 2017-155400

(51) Int. Cl.
*F02D 41/02* (2006.01)
*F01N 3/10* (2006.01)
(Continued)

(52) U.S. Cl.
CPC .......... *F02D 41/025* (2013.01); *F01N 3/101* (2013.01); *F01N 9/00* (2013.01); *F02D 41/0035* (2013.01); *F02M 25/08* (2013.01); *F01N 2260/04* (2013.01); *F01N 2430/06* (2013.01); *F01N 2560/025* (2013.01); *F01N 2570/04* (2013.01); *F01N 2900/1404* (2013.01); *F01N 2900/1612* (2013.01); *F02D 2200/021* (2013.01); *F02D 2200/04* (2013.01); *F02D 2200/0802* (2013.01); *F02M 2025/0845* (2013.01)

(58) Field of Classification Search
CPC combination set(s) only.
See application file for complete search history.

(56) References Cited

U.S. PATENT DOCUMENTS 5,950,606 A 9/1999 Iida et al.
6,325,041 B1 * 12/2001 Mamiya ................ F01N 3/0842
123/299

(Continued)

FOREIGN PATENT DOCUMENTS

DE 19831310 B4 1/2009
JP 2012-057492 3/2012

*Primary Examiner* — Binh Q Tran
(74) *Attorney, Agent, or Firm* — Finnegan, Henderson, Farabow, Garrett & Dunner, LLP

(57) ABSTRACT

A controller for an internal combustion engine includes processing circuitry that performs a dither control process on condition that a temperature increase request of a catalyst is made. The processing circuitry operates fuel injection valves so that during the dither control process, one or more cylinders are lean combustion cylinders in a first period and another one or more cylinders are rich combustion cylinders and so that the average value of an exhaust gas-fuel ratio is a target air-fuel ratio in a second period including the first period. The dither control process is restricted in a manner that, on condition that the rich process is performed, the degree of richening of the richest exhaust gas-fuel ratio of exhaust gas-fuel ratios in the cylinders is reduced.

6 Claims, 5 Drawing Sheets

(51) Int. Cl.
*F02M 25/08* (2006.01)
*F02D 41/00* (2006.01)
*F01N 9/00* (2006.01)

(56) References Cited

U.S. PATENT DOCUMENTS

| | | | |
|---|---|---|---|
| 6,968,678 B2* | 11/2005 | Le Leux | F01N 3/08 123/1 A |
| 7,493,890 B2* | 2/2009 | Etou | F02D 15/00 123/406.29 |
| 8,694,226 B2* | 4/2014 | Kurahashi | F02D 41/0085 701/103 |
| 10,550,788 B2* | 2/2020 | Myojo | F01N 3/0871 |
| 2010/0217503 A1* | 8/2010 | Leone | F02B 17/005 701/103 |
| 2012/0185156 A1* | 7/2012 | Iwazaki | F02D 41/0042 701/104 |
| 2017/0114744 A1* | 4/2017 | Martin | F02M 25/0818 |
| 2017/0122227 A1* | 5/2017 | Rollinger | F02D 31/001 |

\* cited by examiner

CONTROLLER FOR INTERNAL COMBUSTION ENGINE AND METHOD FOR CONTROLLING INTERNAL COMBUSTION ENGINE

BACKGROUND ART

The present invention relates to a controller for an internal combustion engine and a method for controlling an internal combustion engine.

Japanese Patent Application Publication No. 2012-57492 describes an example of a controller executing perturbation control (dither control) so that in response to a warm-up request (temperature increase request) of a catalyst device (catalyst), the air-fuel ratio in some of a plurality of cylinders is set to be richer than the stoichiometric air-fuel ratio and the air-fuel ratio in the remaining cylinders is set to be leaner than the stoichiometric air-fuel ratio.

Purge control that is known in the art draws fuel vapor into an intake passage from a fuel tank storing fuel.

When performing dither control, a difference is produced between the air-fuel ratio in a rich combustion cylinder and the air-fuel ratio in a lean combustion cylinder. Thus, it is difficult to set the air-fuel ratio so as to avoid unsatisfactory combustion as compared with when controlling the air-fuel ratio in every one of the cylinders. When performing purge control, fuel vapor is not always uniformly distributed to the cylinders. This may result in the air-fuel ratio differing between cylinders. Thus, when performing dither control during purge control, the combustion deterioration tendency resulting from dither control will further increase the difference in the fuel vapor distributed between cylinders by purge control.

SUMMARY

A plurality of aspects of the present invention and operational effects thereof are described below.

1. In a controller for an internal combustion engine, the internal combustion engine includes a catalyst, configured to purify exhaust gas discharged from a plurality of cylinders, a plurality of fuel injection valves, respectively configured to supply fuel to the plurality of cylinders, a canister, configured to collect fuel vapor of fuel stored in a fuel tank, and an adjustment device, configured to adjust a flow rate of the fuel vapor collected by the canister flowing into an intake passage. The controller includes processing circuitry configured to perform a dither control process on condition that a temperature increase request of the catalyst is made. The dither control process includes operating the fuel injection valves so that one or more of the plurality of cylinders is a lean combustion cylinder in which an air-fuel ratio is leaner than a stoichiometric air-fuel ratio and another one or more of the plurality of cylinders is a rich combustion cylinder in which the air-fuel ratio is richer than the stoichiometric air-fuel ratio. The processing circuitry is further configured to perform a purge control process that operates the adjustment device to control a purge rate that is a value obtained by dividing a purge flow rate by an intake air flow rate, and a difference limiting process that limits and decreases a difference of the air-fuel ratio in the rich combustion cylinder and the air-fuel ratio in the lean combustion cylinder resulting from the dither control process on condition that the purge control process is controlling the flow rate of the fuel vapor at a value greater than zero.

In a method for controlling an internal combustion engine, the internal combustion engine includes a catalyst, configured to purify exhaust gas discharged from a plurality of cylinders, a plurality of fuel injection valves, respectively configured to supply fuel to the plurality of cylinders, a canister, configured to collect fuel vapor of fuel stored in a fuel tank, and an adjustment device, configured to adjust a flow rate of the fuel vapor collected by the canister flowing into an intake passage. The method includes performing a dither control process on condition that a temperature increase request of the catalyst is made. The dither control process includes operating the fuel injection valves so that one or more of the plurality of cylinders is a lean combustion cylinder in which an air-fuel ratio is leaner than a stoichiometric air-fuel ratio and another one or more of the plurality of cylinders is a rich combustion cylinder in which the air-fuel ratio is richer than the stoichiometric air-fuel ratio, performing a purge control process that operates the adjustment device to control a purge rate that is a value obtained by dividing a purge flow rate by an intake air flow rate, and performing a difference limiting process that limits and decreases a difference of the air-fuel ratio in the rich combustion cylinder and the air-fuel ratio in the lean combustion cylinder resulting from the dither control process on condition that the purge control process is controlling the flow rate of the fuel vapor at a value greater than zero.

In the above configurations, the difference limiting process limits and decreases the difference of the air-fuel ratio in the rich combustion cylinder and the air-fuel ratio in the lean combustion cylinder resulting from the dither control process on condition that the purge control process is controlling the flow rate of the fuel vapor at a value greater than zero. When the difference of the air-fuel ratio in the rich combustion cylinder and the air-fuel ratio in the lean combustion cylinder is small, the combustion deterioration tendency resulting from dither control will be more limited than when the difference of the air-fuel ratio in the rich combustion cylinder and the air-fuel ratio in the lean combustion cylinder is large. Thus, the difference limiting process decreases the combustion deterioration tendency resulting from dither control, as compared with when the dither control is not executed, that would increase the difference in the fuel vapor distributed between cylinders by purge control.

2. In the controller for an internal combustion engine according to the first aspect, the difference limiting process includes limiting the difference of the air-fuel ratio in the rich combustion cylinder and the air-fuel ratio in the lean combustion cylinder to decrease the difference on condition that a purge parameter, which is a parameter having a positive correlation with the purge rate, is greater than or equal to a threshold value.

In the above configuration, the difference limiting process is performed on condition that the purge parameter is greater than or equal to the threshold value. This allows the dither control process to be performed without any limitation imposed by the difference limiting process when the amount of fuel vapor is small and the combustion deterioration tendency resulting from the execution of the dither control will not increase differences between the cylinders in the distributed fuel vapor.

3. In the controller for an internal combustion engine according to the second aspect, the purge parameter is a value obtained by dividing the flow rate of the fuel vapor flowing into the intake passage from the canister by the intake air flow rate.

Even when the purge rate is the same, the ratio of the flow rate of the fuel vapor to the intake air flow rate increases changes in accordance with the concentration of the fuel vapor in the canister. An increase in the ratio of the flow rate of the fuel vapor to the intake air flow rate will increase the combustion deterioration tendency resulting from the execution of the dither control and thereby increase differences between the cylinders in the distributed fuel vapor. In the above configuration, the difference limiting process is performed when the ratio of the flow rate of the fuel vapor to the intake air flow rate is greater than or equal to the threshold value. This minimizes situations in which the difference limiting process is actually performed.

4. In the controller for an internal combustion engine according to any one of the first to third aspects, the dither control process includes an amplitude setting process that sets the difference of the air-fuel ratio in the rich combustion cylinder and the air-fuel ratio in the lean combustion cylinder, the difference limiting process includes performing an upper limit guard process on the set difference to limit the difference set by the amplitude setting process to less than or equal to an upper limit guard value, and the dither control process is performed based on the difference that has undergone the upper limit guard process.

In the above configuration, the upper limit guard process limits the difference of the air-fuel ratio in the rich combustion cylinder and the air-fuel ratio in the lean combustion cylinder to less than or equal to the upper limit guard value.

5. In the controller for an internal combustion engine according to the fourth aspect, the difference limiting process includes variably setting the upper limit guard value in accordance with an operating point of the internal combustion engine.

The combustion deterioration tendency resulting from the execution of the dither control that increase differences between the cylinders in the distributed fuel vapor may differ in accordance with the operating point of the internal combustion engine. In the above configuration, the upper limit guard value is variably set in accordance with the operating point of the internal combustion engine to minimize difference limiting.

Other aspects and advantages of the present invention will become apparent from the following description, taken in conjunction with the accompanying drawings, illustrating by way of example the principles of the invention.

BRIEF DESCRIPTION OF DRAWINGS

The invention, together with objects and advantages thereof, may best be understood by reference to the following description of the presently preferred embodiments together with the accompanying drawings in which.

DETAILED DESCRIPTION OF THE EMBODIMENTS

First Embodiment

A controller for an internal combustion engine according to a first embodiment will now be described with reference to the drawings.

Figure 1:
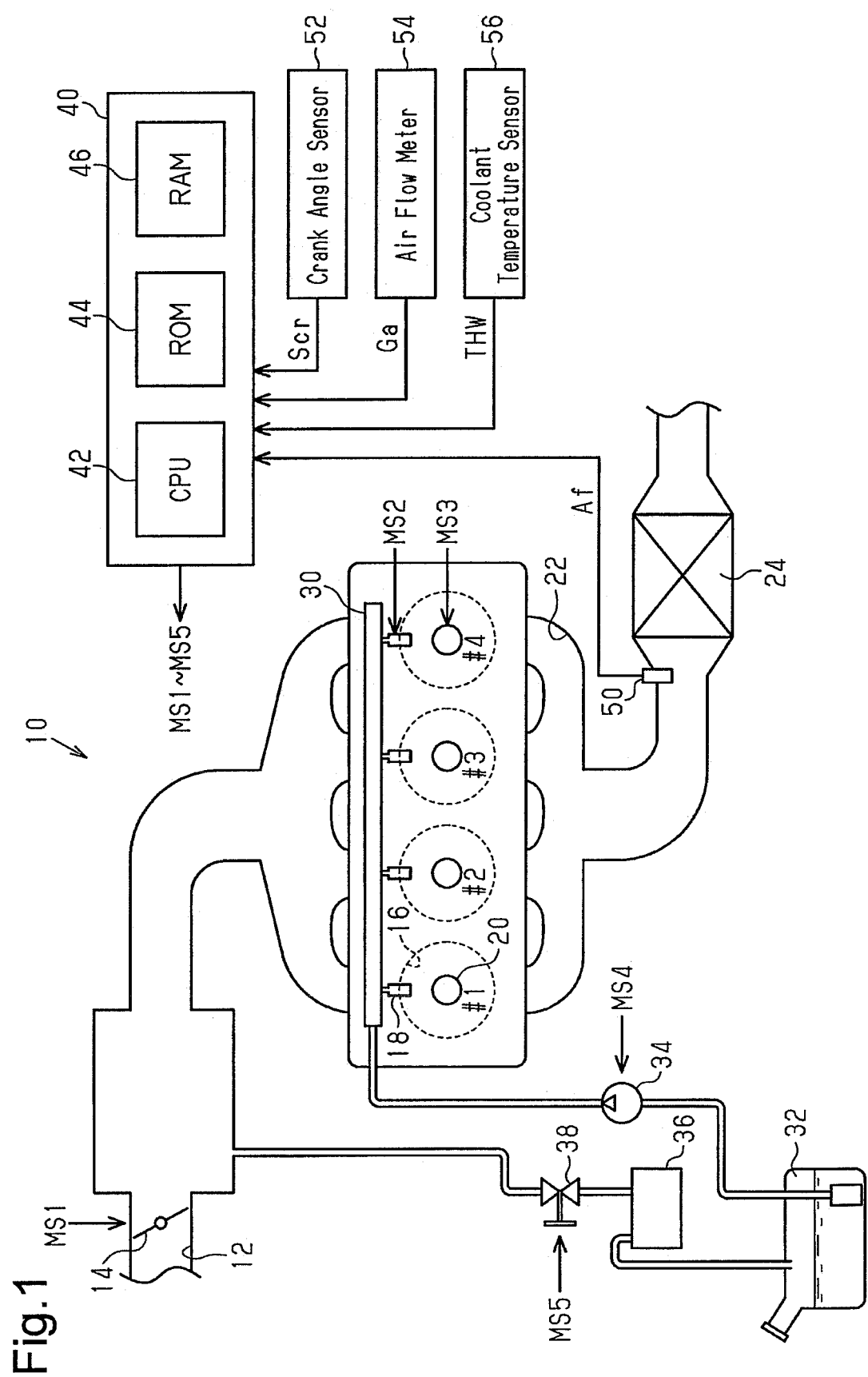
FIG. 1 is a diagram showing an internal combustion engine and its controller according to a first embodiment.

In an internal combustion engine 10 shown in FIG. 1, air drawn from an intake passage 12 flows through a throttle valve 14 into a combustion chamber 16 of each cylinder. A fuel injection valve 18, which injects fuel, and an ignition device 20, which generates spark discharges, project into the combustion chamber 16. A mixture of air and fuel is burned in each combustion chamber 16, and the burned air-fuel mixture is discharged as exhaust gas out of the combustion chamber 16 into an exhaust passage 22. A three-way catalyst 24 having an oxygen storage capability is arranged in the exhaust passage 22.

The fuel injection valve 18 injects fuel into a delivery pipe 30. A fuel pump 34 feeds the delivery pipe 30 with fuel from a fuel tank 32. Some of the fuel stored in the fuel tank 32 vaporizes into fuel vapor. The fuel vapor is collected by a canister 36. The fuel vapor collected by the canister 36 flows through a purge valve 38, of which the open degree is electronically operable, and enters the intake passage 12.

A controller 40 operates various operation parts in the internal combustion engine 10 such as the throttle valve 14, the fuel injection valves 18, the ignition devices 20, the fuel pump 34, and the purge valve 38 to control the internal combustion engine 10 and its control amount (torque, exhaust components, and the like). In this case, the controller 40 refers to an air-fuel ratio Af detected by an air-fuel ratio sensor 50 at the upstream side of the three-way catalyst 24, an output signal Scr of a crank angle sensor 52, an intake air flow rate Ga detected by an air flow meter 54, and a temperature of the coolant of the internal combustion engine 10 (coolant temperature THW) detected by a coolant temperature sensor 56. The controller 40 includes a CPU 42, a ROM 44, and a RAM 46. The CPU 42 executes programs stored in the ROM 44 to control the control amounts described above.

Figure 2:
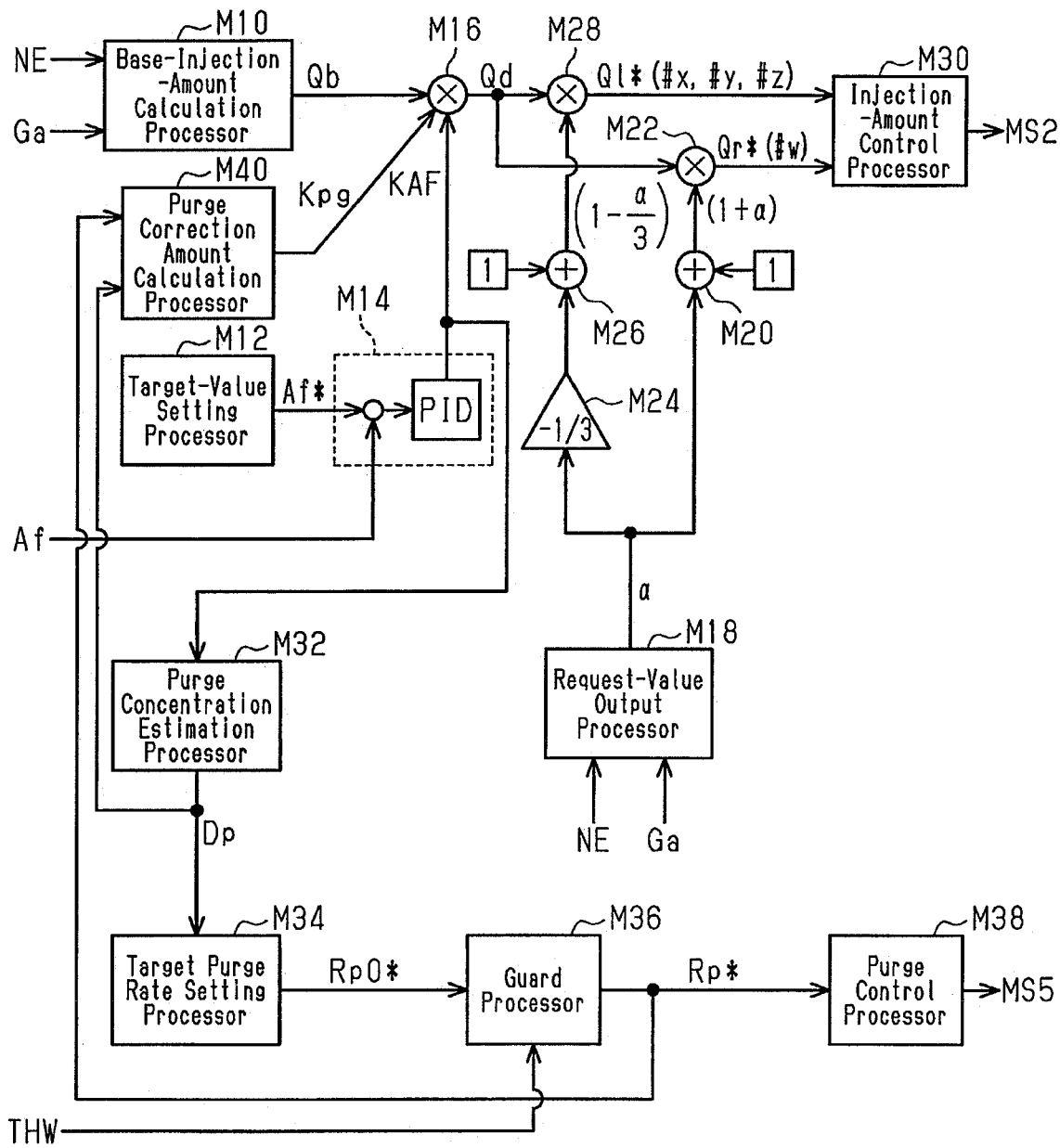
FIG. 2 is a block diagram showing part of a process performed by the controller shown in FIG. 1.

FIG. 2 shows part of a process achieved by the CPU 42 executing the programs stored in the ROM 44. A base-injection-amount calculation processor M10 calculates a base injection amount Qb as an open loop operation amount, which is an operation amount for open-loop controlling the air-fuel ratio of an air-fuel mixture in the combustion chamber 16 to a target air-fuel ratio, based on a rotation speed NE, calculated from the output signal Scr of the crank angle sensor 52, and the intake air flow rate Ga.

A target-value setting processor M12 sets a target value Af* of a feedback control amount for controlling the air-fuel ratio of the air-fuel mixture burned in the combustion chamber 16 to the target air-fuel ratio or the like. A feedback control processor M14 calculates a feedback operation amount KAF, which is an operation amount for converging the air-fuel ratio Af functioning as a feedback control amount on the target value Af* through feedback control. In the first embodiment, the sum of output values of a proportional element, an integral element, and a differential element, which receive the difference between the target value Af* and the air-fuel ratio Af as inputs, is defined as the feedback operation amount KAF.

A requested injection amount processor M16 calculates a requested injection amount Qd obtained by multiplying the base injection amount Qb by the feedback operation amount KAF to correct the base injection amount Qb. A request-value output processor M18 calculates an injection-amount correction request value α for dither control in which a different air-fuel ratio is set and output for the burned air-fuel mixture subject in each cylinder, while using the average value of the air-fuel ratios of exhaust gas (exhaust gas-fuel ratios) of all cylinders #1 to #4 in the internal combustion engine 10 as a target air-fuel ratio. In the dither control of the first embodiment, one of the first cylinder #1 to the fourth cylinder #4 is set as a rich combustion cylinder in which the air-fuel ratio of the air-fuel mixture is richer than the stoichiometric air-fuel ratio, and the remaining three cylinders are defined as lean combustion cylinders in which the air-fuel ratio of the air-fuel mixture is richer than the stoichiometric air-fuel ratio. The injection amount of the rich combustion cylinder is set to be "1+α" times greater than the requested injection amount Qd, and the injection amount of the lean combustion cylinder is set to be "1−(α/3)" times greater than the requested injection amount Qd.

The air-fuel ratio of subject exhaust gas is defined using a hypothetic air-fuel mixture. That is, the hypothetic air-fuel mixture is defined as an air-fuel mixture formed from only fresh air and fuel, in which the non-combusted fuel concentration (for example, HC), incomplete combustion component concentration (for example, CO), and oxygen concentration of exhaust gas generated by combustion are the same as the non-combusted fuel concentration, incomplete combustion component concentration, and oxygen concentration of the exhaust gas. The exhaust gas-fuel ratio is defined as the air-fuel ratio of the hypothetic air-fuel mixture. Combustion of the hypothetic air-fuel mixture is not limited to combustion in which either the non-combusted fuel concentration and the incomplete combustion component concentration or the oxygen concentration is zero or a value substantially equal to zero. The combustion of the hypothetic air-fuel mixture may include combustion in which the non-combusted fuel concentration, the incomplete combustion component concentration, and the oxygen concentration are larger than zero. The average value of the exhaust gas-fuel ratios of a plurality of cylinders is set as the exhaust gas-fuel ratio for when the exhaust gas discharged from the cylinders is entirely set as the subject exhaust gas. When setting the injection amount of the lean combustion cylinder and the rich combustion cylinder, the average value of the fuel-air ratios of the air-fuel mixtures burned in the cylinders is defined as a target fuel-air ratio so that the average value of the air-fuel ratios of exhaust gas can be set as the target air-fuel ratio. The fuel-air ratio is the inverse number of the air-fuel ratio.

A correction-coefficient calculation processor M20 adds the injection-amount correction request value α to "1" to calculate the correction coefficient of the requested injection amount Qd for the rich combustion cylinder. A dither correction processor M22 multiplies the requested injection amount Qd by a correction coefficient "1+α" to calculate an injection amount command value Qr* of the rich combustion cylinder.

A multiplication processor M24 multiplies the injection-amount correction request value α by "−1/3." A correction-coefficient calculation processor M26 adds the output value of the multiplication processor M24 to "1" to calculate the correction coefficient of the requested injection amount Qd for the lean combustion cylinder. A dither correction processor M28 multiplies the requested injection amount Qd by a correction coefficient "1−(α/3)" to calculate an injection amount command value Ql* of the lean combustion cylinder.

An injection-amount control processor M30 generates an operation signal MS2 of the fuel injection valve 18 in the rich combustion cylinder based on the injection amount command value Qr* and outputs the operation signal MS2 to the fuel injection valve 18 to operate the fuel injection valve 18 so that the amount of fuel injected from the fuel injection valve 18 is in accordance with the injection amount command value Qr*. In addition, the injection-amount control processor M30 generates an operation signal MS2 of the fuel injection valve 18 in the lean combustion cylinder based on the injection amount command value Ql* and outputs the operation signal MS2 to the fuel injection valve 18 to operate the fuel injection valve 18 so that the amount of fuel injected from the fuel injection valve 18 is in accordance with the injection amount command value Ql*. Among the cylinders #1 to #4, the one functioning as the rich combustion cylinder is desirably changed to a period longer than a single combustion cycle. When the injection-amount correction request value α is zero, the dither correction processors M22, M28 multiply the requested injection amount Qd by "1." Thus, when the injection-amount correction request value α is zero, the injection amount command value of each of the cylinders #1 to #4 is the requested injection amount Qd. However, for the sake of convenience, FIG. 2 shows the injection amount command values Ql*, Qr* for dither control. When the injection-amount correction request value α is zero, an operation signal MS2 is calculated from the requested injection amount Qd.

A purge concentration estimation processor M32 estimates the concentration of fuel vapor (purge concentration Dp) in the fluid (purge gas) flowing into the intake passage 12 from the canister 36 based on the feedback operation amount KAF. In detail, the purge concentration estimation processor M32 updates the purge concentration Dp to a small value when the feedback operation amount KAF corrects and increases the base injection amount Qb and updates the purge concentration Dp to a large value when the feedback operation amount KAF corrects and decreases the base injection amount Qb.

A target purge rate setting processor M34 sets a target value of a purge rate (target purge rate Rp0*) based on the purge concentration Dp. The purge rate is obtained by dividing the flow rate of purge gas (purge flow rate) by the intake air flow rate Ga. The target purge rate setting processor M34 sets the target purge rate p0* to a larger value when the purge concentration Dp is high when the purge concentration Dp is low.

A guard processor M36 performs an upper limit guar process on the target purge rate Rp0* to limit the target purge rate Rp0* to less than or equal to an upper limit guard value based on the coolant temperature THW. Then, the guard processor M36 outputs the target purge rate Rp0* that has undergone the upper limit guard process. In detail, the guard processor M36 sets the upper limit guard value to "0" when the coolant temperature THW is less than or equal to a specified temperature to set the target purge rate Rp* to "0" and prohibit flow-out control of fuel vapor from the canister 36 to the intake passage 12.

A purge control processor M38 outputs an operation signal MS5 to the purge valve 38 to operate the purge valve 38 so that the purge rate becomes the target purge rate Rp*. A purge correction amount calculation processor M40 calculates a decreasing correction amount Kpg based on the purge concentration Dp and the target purge rate Rp* to correct and decrease the base injection amount Qb in accordance with the flow rate of fuel vapor entering the intake passage 12 from the canister 36. Then, the purge correction amount calculation processor M40 outputs the decreasing correction amount Kpg to the requested injection amount processor M16. The decreasing correction amount Kpg is set to "1" when flow-in control of the fuel vapor from the canister 36 to the intake passage 12 is stopped.

Figure 3:
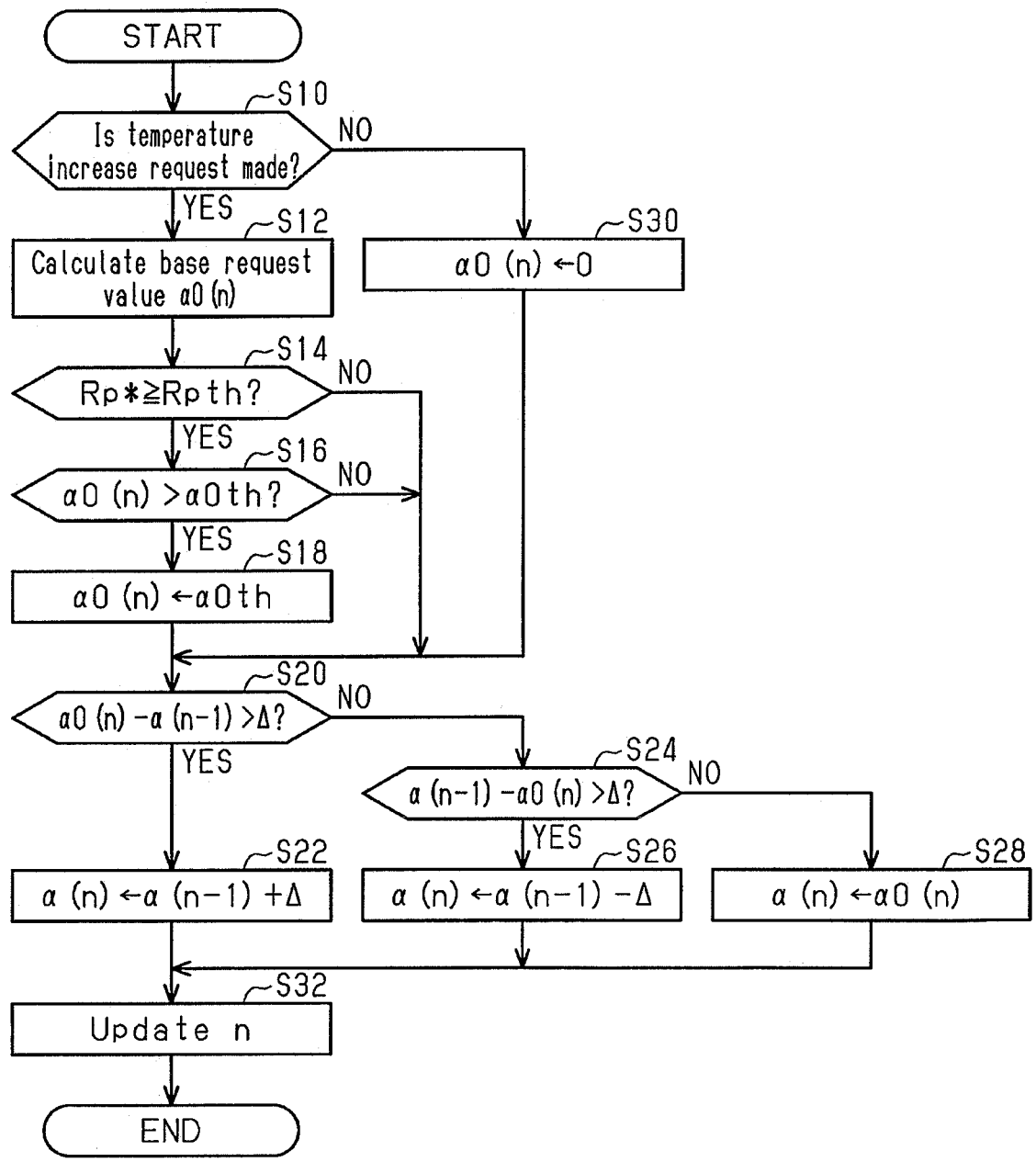
FIG. 3 is a flowchart showing the procedures of a process performed by the request-value output processor in the controller shown in FIG. 1.

FIG. 3 shows the processing procedures of the request-value output processor M18. The process shown in FIG. 3 is achieved by the CPU 42, for example, repeatedly executing the programs stored in the ROM 44 in predetermined cycles. Numbers following alphabet "S" represent step numbers in the following description.

In the series of processes shown in FIG. 3, the CPU 42 determines first whether or not a temperature increase request relating to temperature increase of the three-way catalyst 24 using dither control has been made (S10). In the first embodiment, the temperature increase request is made when a warm-up request of the three-way catalyst 24 is made or when conditions for performing a sulfur poisoning recovery process on the three-way catalyst 24 are satisfied. When the amount of air cumulated from engine starting is greater than or equal to a specified value, the temperature at an upstream end of the catalyst is determined as being an active temperature. Thus, the warm-up request of the three-way catalyst 24 is made when the coolant temperature THW is less than or equal to a predetermined temperature and the cumulative amount of air is less than or equal to a predetermined value (>specified value). The conditions for performing a sulfur poisoning recovery process only need to be satisfied when the sulfur poisoning amount of the three-way catalyst 24 is greater than or equal to a predetermined value. The sulfur poisoning amount may be calculated, for example, by increasing the increase amount for the poisoning amount as the rotation speed NE or filling efficiency η increases and cumulating the increase amount. The filling efficiency η is a parameter indicating a load and calculated by the CPU 42 based on the rotation speed NE and the intake air flow rate Ga.

Next, the CPU 42 calculates a base request value α0, which is a base value of the injection-amount correction request value α, based on the rotation speed NE and the filling efficiency η (S12). The base request value α0 is maximized in an intermediate load region. This is because combustion is more unstable in a low load region than in an intermediate load region. Thus, it is difficult to increase the base request value α0 in the low load region as compared to the intermediate load region. Further, the temperature of exhaust gas is high in a high load region even when dither control is not executed. Specifically, the base request value α0 is set to be larger than that when the rotation speed NE is low. That is, as the rotation speed NE increases, the base request value α0 is set to a larger value. This is because combustion at a high rotation speed NE is more stable than that at a low rotation speed NE, and thus the base request value α0 is easily set to a large value. Specifically, the ROM 44 stores map data of the relationship between the rotation speed NE and the filling efficiency η, which serves as input variables, and the base request value α0, which serves as an output variable. The CPU 42 need only use the map data to map-compute the base request value α0. The map is a data set of discrete values of the input variables and values of the output variables corresponding to the values of the input variables. In the map computation, for example, when the value of the input variable matches any of the values of the input variables in the map data, the corresponding value of the output variable is the computation result. When the value of the input variable does not match any of the values of the input variables in the map data, a value obtained by interpolating a plurality of values of the output variables included in the data set is the computation result.

FIG. 3 in the process of S12 includes "α0(n)," in which a variable n is used. The variable n is used to designate specific data from time series data such as the base request value α0. In the following description, the data calculated in the current control period of the series of processes shown in FIG. 3 is "n," and the data calculated in the previous control period is "n−1."

Next, the CPU 42 determines whether or not the target purge rate Rp* is greater than or equal to a specified value Rpth (S14). This process is performed to determine whether or not to restrict execution of the dither control. The specified value is set to a limit value at which the combustion deterioration tendency resulting from dither control will further increase the difference in the fuel vapor distributed between cylinders by purge control. That is, when dither control is performed, the air-fuel ratio of the air-fuel mixture in cylinders #1 to #4 will be leaner or richer than the target air-fuel ratio. This will deteriorate combustion as compared with when the air-fuel ratio of the air-fuel mixture in cylinders #1 to #4 is set to the target air-fuel ratio. The purge gas entering the intake passage 12 from the canister 36 because of purge control is not uniformly distributed when flowing into cylinders #1 to #4. This may result in differences between the cylinders. Thus, the requested injection amount Qd may differ from the fuel required to control the air-fuel ratio of the air-fuel mixture in each of cylinders #1 to #4 at the target air-fuel ratio. The difference will increase the combustion deterioration tendency resulting from dither control. In other words, for example, when a large amount of fuel vapor flows into a rich combustion chamber, the air-fuel ratio of that cylinder will be excessively rich thereby destabilizing combustion. Further, for example, when the fuel vapor flowing into one lean combustion cylinder is less than the fuel vapor flowing into the other lean combustion cylinders, the air-fuel ratio of that cylinder will be excessively lean thereby destabilizing combustion.

If the CPU 42 determines that the target purge rate Rp* is greater than or equal to the specified value Rpth (S14: YES), the CPU 42 determines whether or not the base request value α0(n) is greater than an upper limit guard value α0th (S16). If the CPU 42 determines that the base request value α0(n) is greater than the upper limit guard value α0th (S16: YES), the CPU 42 substitutes the upper guard value α0th for the base request value α0(n) (S18).

If the CPU 42 completes the process of S18 or makes a negative determination in S14, S16, the CPU 42 determines whether or not the value obtained by subtracting the previous injection-amount correction request value α(n−1) from the presently calculated base request value α0(n) is greater than a threshold Δ (S20). If the CPU 42 determines that the value α0(n)−α(n−1) is greater than the threshold Δ (YES in S18), the CPU 42 substitutes the value obtained by adding the threshold Δ to the previous injection-amount correction request value α(n−1) for the present injection-amount correction request value α(n) (S22). If the CPU 42 determines that the value α0(n)−α(n−1) is less than or equal to the threshold Δ (S20: NO), the CPU 42 determines whether or not the value obtained by subtracting the presently calculated base request value α0(n) from the previous injection-amount correction request value α(n−1) is greater than the threshold Δ (S24). When the CPU 42 determines that the value α(n−1)−α0(n) is greater than the threshold Δ (S24: YES), the CPU 42 substitutes the value obtained by subtracting the threshold Δ from the previous injection-amount correction request value α(n−1) for the present injection-amount correction request value α(n) (S24). When the CPU 42 determines that the value α(n−1)−α0(n) is less than or equal to the threshold Δ (S24: NO), the CPU 42 substitutes the current base request α0(n) for the present injection-amount correction request value α(n) (S28).

When the CPU 42 determines that the temperature increase request has not been made (NO in S10), the CPU 42 sets the present base request value α0(n) to zero (S30) and then proceeds to the process of S20.

When the processes of S22, S26, and S28 are completed, the CPU 42 updates the variable n (S32) and temporarily ends the series of processes shown in FIG. 3.

The operation of the first embodiment will now be described.

Figure 4:
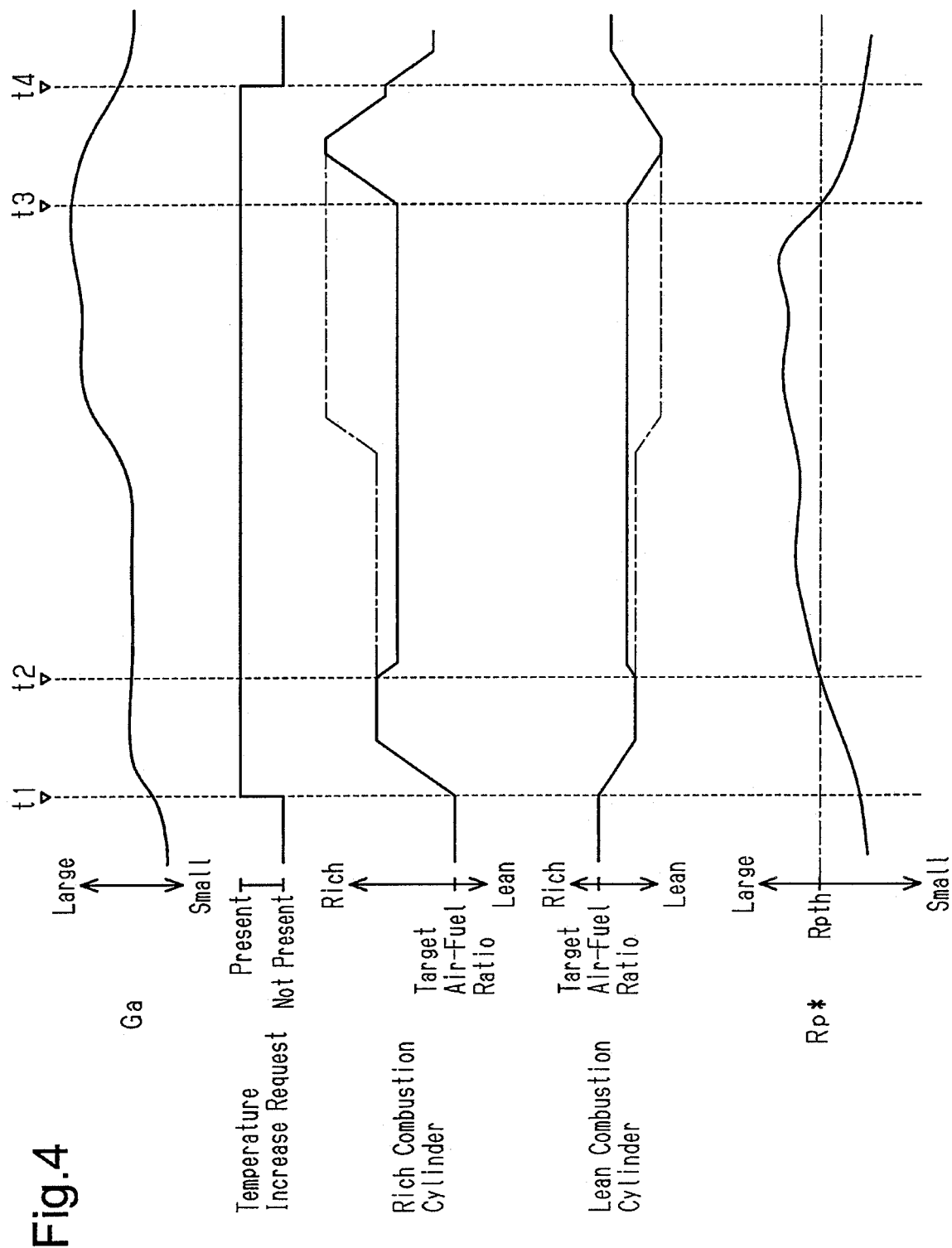
FIG. 4 is a time chart showing a restriction shift of dither control in the controller shown in FIG. 1.

FIG. 4 shows the shifting of the intake air flow rate Ga, whether or not a temperature increase request exists, the air-fuel ratio of a rich combustion cylinder, the air-fuel ratio of a lean combustion cylinder, and the target purge rate Rp*. FIG. 4 shows a period in which the cylinder functioning as the rich combustion chamber is not switched. Further, the period in which the air-fuel ratio of cylinders #1 to #4 matches the target air-fuel ratio is illustrated as "rich combustion cylinder" and "lean combustion cylinder."

As shown in FIG. 4, when the generation of a temperature increase request at time t1 starts the dither control, the air-fuel ratio is set to be richer than the target air-fuel ratio in one of cylinders #1 to #4, and the air-fuel ratio of the air-fuel mixture is set to be leaner than the target air-fuel ratio in the remaining cylinders. The lean degree of the air-fuel ratio in the rich combustion cylinder and the lean degree of the air-fuel ratio in the lean combustion cylinder are set in accordance with the base request value α0. However, at time t2, when the target purge rate Rp* becomes greater than or equal to the specified value, the base request value α0 obtained in the process of S12 limits the upper limit guard value α0th. FIG. 4 shows an example in which a gradual changing process performed through the processes of S20 to S28 gradually decreases the injection-amount correction request value α to approach the upper guard limit value α0th. This limits the difference between the air-fuel ratio of the rich combustion cylinder and the air-fuel ratio of the lean combustion cylinder to be lower than when the target purge rate Rp* is less than the specified value Rpth. FIG. 4 uses single-dashed lines to illustrate the air-fuel ratio of the rich combustion cylinder and the air-fuel ratio of the lean combustion cylinder if the target purge value Rp* were to be less than the specified value Rpth.

Then, at time t3, when the target purge rate Rp* becomes less than the specified value Rpth, the guard process using upper limit guard value α0 th is no longer performed. Thus, dither control is performed based on the base request value α0 set by the process of S12 until time t4 at which the temperature increase request is no longer generated.

In this manner, in the first embodiment, when the target purge rate Rp* is greater than or equal to the specified value Rpth, the baser request value α0 is limited by the upper limit guard value α0th. This decreases the combustion deterioration tendency resulting from dither control that would increase the difference in the fuel vapor distributed between cylinders by purge control.

Second Embodiment

A second embodiment will now be described focusing on differences from the first embodiment.

Figure 5:
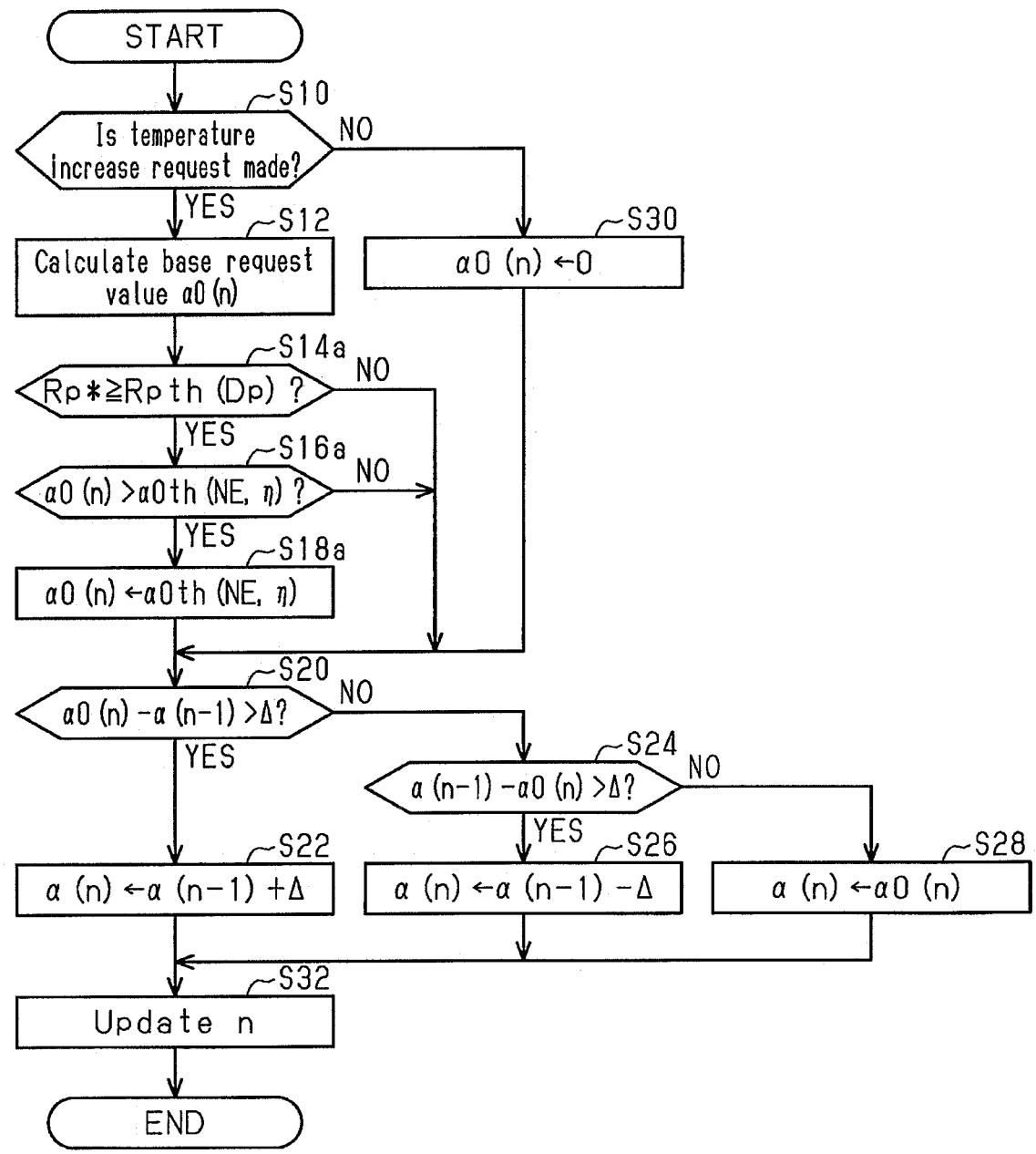
FIG. 5 is a flowchart showing the procedures of a process performed by a request-value output processor in a controller according to a second embodiment.

FIG. 5 shows the processing procedures of the request-value output processor M18 in the second embodiment. The process shown in FIG. 5 is achieved by the CPU 42, for example, repeatedly executing the programs stored in the ROM 44 in predetermined cycles. In FIG. 5, the processes corresponding to those of FIG. 3 are denoted by the same step numbers for the sake of convenience.

In the series of processes shown in FIG. 5, after the CPU 42 calculates the base request value α0 (S12), the CPU 42 variably sets the specified value Rpth in accordance with the purge concentration Dp and determines whether or not the target purge rate Rp* is greater than or equal to the specified value Rpth (S14a). In detail, when the purge concentration value Rpth is large, the CPU 42 sets the specified value Rpth to be less that that when the purge concentration Dp is small. That is, as the purge concentration Dp increases, the CPU 42 sets a smaller specified value Rpth. If the purge rate is the same, a larger amount of fuel vapor flows into the intake passage 12 from the canister 36 when the purge concentration Dp is large than when the purge concentration Dp is small. As a result, there will be a tendency of the difference increasing in the fuel vapor distributed between cylinders by the purge control. Specifically, the ROM 44 stores map data in which the purge concentration Dp is an input variable, and the specified value Rpth is an output variable. The CPU 42 map-computes the specified value Rpth.

When determining that the target purge rate Rp* is greater than or equal to the specified value Rpth (S14a: YES), the CPU 42 variably sets the upper limit guard value α0th, based on the rotation speed NE and the filling efficiency η, and determines whether or not the upper limit guard value α0th is greater than the upper limit guard value α0th (S16a). The upper limit guard value α0th is variably set based on the rotation speed NE and the filling efficiency η because an operating point of the internal combustion engine 10 changes the combustion deterioration tendency resulting from dither control that will further increase the difference in the fuel vapor distributed between cylinders by purge control. In the second embodiment, the operating point is specified with the rotation speed NE and the filling efficiency η. Further, when there is a large combustion deterioration tendency resulting from dither control that will further increase the difference in the fuel vapor distributed between cylinders by purge control, the CPU 42 sets a smaller upper limit guard value α0th than when there is a small combustion deterioration tendency resulting from dither control that will further increase the difference in the fuel vapor distributed between cylinders by purge control. That is, the CPU 42 sets the upper limit guard value α0th to a smaller value as the combustion deterioration tendency resulting from dither control that will further increase the difference in the fuel vapor distributed between cylinders by purge control increases. Specifically, the ROM 44 stores map data in which the rotation speed NE and the filling efficiency η are input variables, and the upper limit guard value α0th is an output variable. The CPU 42 map-computes the upper limit guard value α0th.

When determining that the base request value α0 is greater than the upper limit guard value α0th, the CPU 42 substitutes the upper limit guard value α0th for the base request value α0(n) (S18a). When the process of S18a is completed or when a negative determination is given in S14a, S16a, the CPU 42 shifts to the process of S20.

The second embodiment has the following advantages in addition to the advantages of the first embodiment.

(1) When the purge concentration Dp is large, the specified value Rpth is set to a smaller value than when the purge concentration Dp is small. That is, the specified value Rpth is set to a smaller value as the purge concentration Dp increases. This allows for determination of whether or not a vapor ratio, which is a value obtained by dividing the flow rate of fuel vapor flowing into the intake passage 12 from the canister 36 by the intake air flow rate, is greater than or equal the threshold value. Thus, when the ratio of the flow rate of the fluid flowing into the intake passage 12 from the canister 36 is small, execution of the guard process with the upper limit guard value α0the is restricted.

(2) The upper limit guard value α0th is variably set based on the rotation speed NE and the filling efficiency η. This allows the upper limit guard value α0th to be maximized taking into consideration that the combustion deterioration tendency resulting from dither control that will further increase the difference in the fuel vapor distributed between cylinders by purge control differs in accordance with the operating point of the internal combustion engine 10.

<Corresponding Relationship>

The corresponding relationship of items described in the above embodiments and items described in the "SUMMARY" will now be described. The corresponding relationship is described below for each number shown in the "SUMMARY."

[1] The catalyst corresponds to the three-way catalyst 24, and the adjustment device corresponds to the purge valve 38. The dither control process corresponds to the processes of the correction-coefficient calculation processor M20, the dither correction processor M22, the multiplication processor M24, the correction-coefficient calculation processor M26, the dither correction processor M28, the injection-amount control processor M30, and the processes of S10, S12, and S20 to S28. The purge control process corresponds to the processes of the target purge rate setting processor M34, the guard processor M36, and the purge control processor M38, and the difference limiting process corresponds to the processes of S14 to S18 or the processes of S14a to S18a.

[2] The purge parameter corresponds to the purge rate in the process of FIG. 3 and corresponds to the vapor ratio in the process of FIG. 5. The threshold value corresponds to the specified value Rpth in the process of FIG. 3 and corresponds to the vapor ratio when the target purge rate Rp* becomes the specified value Rpth in the process of FIG. 5.

[3] The difference limiting process corresponds to the processes of S14a to S18a.

[4] The amplitude setting process corresponds to the process of S12.

[5] The difference limiting process corresponds to the processes of S16a and S18a.

Other Embodiments

At least one of the items in the above embodiments may be modified as described below.

"Purge Control Process"

In the above embodiments, when controlling the purge rate, the target purge rate Rp* is employed as a parameter that is directly used as a control amount, and the purge rate is controlled to be the target purge rate Rp*. However, this is not a limitation. For example, the target vapor ratio may be calculated using the vapor ratio as a control amount, and the vapor ratio may be controlled to be the target vapor ratio to control the purge rate. For example, the parameter having a positive correlation with the vapor ratio (purge parameter) and used in purge control to control the purge rate is not limited to the vapor ratio and may also be, for example, the open degree of the purge valve 38.

"Upper Limit Guard Process"

In the above embodiments, when variably setting the upper limit guard value α0th based on the operating point of the internal combustion engine, the rotation speed NE and the filling efficiency η are used as parameters for determining the operating point. However, this is not a limitation. For example, the operation amount of an accelerator pedal may be used as a parameter determining the load instead of the filling efficiency η. Further, the parameter used to variably set the upper guard limit value α0th based on the operating point may be a parameter that variably sets the upper guard limit value α0th in accordance with a parameter indicating load but does not variably set the upper guard limit value α0th in accordance with the rotation speed NE. Additionally, for example, the parameter used to variably set the upper guard limit value α0th based on the operating point may be a parameter that variably sets the upper guard limit value α0th in accordance with the rotation speed NE but does not variably set the upper guard limit value α0th in accordance with the rotation speed NE.

The parameters undergoing the upper limit guard is not limited to the base request value α0. For example, the upper limit guard process may be performed on a value obtained by performing the processes of S20 to S28 on the base request value α0.

"Difference Limiting Process"

For example, as described above in the section of "purge control process," when the vapor ratio is the parameter directly used as a control amount, THE SPECIFIED VALUE Rpth in the process of S14a is set as a fixed value, and the specified value Rpth is compared with the vapor ratio or the target vapor ratio.

The difference limiting process, which limits the difference between the air-fuel ratio in a rich combustion cylinder and the air-fuel ratio in a lean combustion cylinder resulting from the execution of the purge control process, is not limited to the upper limit guard process. For example, on condition that the purge control process is being performed, the difference between the air-fuel ratio in a rich combustion cylinder and the air-fuel ratio in a lean combustion cylinder may be limited to a fixed value that is set in advance.

"Dither Control Process"

In the above embodiments, the operating point of an internal combustion engine, which serves as the parameter for variably setting the base request value α0, is determined by the rotation speed NE and the filling efficiency η. However, this is not a limitation. For example, the operating point may be determined by only the filling efficiency η or may be determined by the intake air flow rate Ga. It is not required that the base request value α0 be variably set based on the operating point of the internal combustion engine. For example, the base request value α0 may be a fixed value.

In the above embodiments, the number of rich combustion cylinders is greater than that of lean combustion cylinders. However, this is not a limitation. For example, the number of the rich combustion cylinders may be equal to that of the lean combustion cylinders. Moreover, it is not required for all of the cylinders #1 to #4 to be a lean combustion cylinder or a rich combustion cylinder. For example, the air-fuel ratio in a cylinder may be a target air-fuel ratio. It is not required for the average value of exhaust gas-fuel ratios to be the target air-fuel ratio in a single combustion cycle. For example, when there are four cylinders like in the above embodiments, the average value of exhaust gas-fuel ratios in five strokes may be a target value. Alternatively, the average value of exhaust gas-fuel ratios in three strokes may be a target value. However, it is desirable that a period during which a rich combustion cylinder and a lean combustion cylinder both exist be produced once or more in at least every two combustion cycles. That is, when the average value of exhaust gas-fuel ratios in a predetermined period is the target air-fuel ratio, it is desirable that the predetermined period exist in two combustion cycles or less. For example, when the predetermined period is two combustion cycles and a rich combustion cylinder exists only once in the two combustion cycles, the order of appearance of the rich combustion cylinder and the lean combustion cylinder is "R, L, L, L, L, L, L, and L" where R denotes the rich combustion cylinder and L denotes lean combustion cylinder. In this case, there is the period "R, L, L, L", which is a combustion cycle shorter than the predetermined period, and in this period, some of the cylinders #1 to #4 are the lean combustion cylinders and the remaining cylinder is the rich combustion cylinder. When the average value of exhaust gas-fuel ratios in a combustion cycle is not the target air-fuel ratio, it is desirable that the amount of air that is temporarily drawn in an intake stroke of the internal combustion engine and partially blown back to an intake passage before an intake valve is closed be ignorable.

"Requested Injection Amount"

In the above embodiments, the base injection amount Qb is corrected and decreased by the decreasing correction amount Kpg to calculate the requested injection amount Qd. For example, the decreasing correction does not have to be performed with the decreasing correction amount Kpg, and the feedback operation amount KAF may be used to correct and decrease the base injection amount Qb in accordance with the fuel vapor flowing into the intake passage 12 from the canister 36.

The influence of the fuel vapor does not have to be corrected with the same correction amount in cylinders #1 to #4. That is, the fuel injection amount may be corrected for each cylinder taking into account the difference in the flow of fuel vapor into each of cylinders #1 to #4. In this case, if the accuracy for reducing the influence of differences through correction is low, on condition that fuel vapor enters the intake passage 12 from the canister 36, the dither control process is effectively limited.

"Adjustment Device"

In the above embodiments, the purge valve 38 is exemplified as an adjustment device that adjusts the flow of fuel vapor collected by the canister 36 and entering the intake passage 12. For example, in the internal combustion engine 10 that includes the supercharger, taking into account that the pressure of the intake passage 12 may not become lower than that of the canister 36, in addition to the purge valve 38, the internal combustion engine 10 may include a pump that draws in fluid from the canister 36 and sends the fluid to the intake passage 12. In an internal combustion engine including a supercharger, the supercharger absorbs heat from the exhaust gas thereby impeding increases in the temperature of the catalyst located downstream from the supercharger. This is particularly effective when using dither control.

"Catalyst Undergoing Temperature Increase"

The catalyst of which the temperature is increased is not limited to the three-way catalyst 24. A gasoline particulate filter (GPF) including a three-way catalyst may be used. When the GPF is provided downstream of the three-way catalyst 24, the temperature of the GPF may be increased using heat of combustion generated when an non-combusted fuel component and an incomplete combustion component in a rich combustion cylinder are oxidized by oxygen in a lean combustion cylinder in the three-way catalyst 24. When a catalyst having an oxygen storage capability does not exist at the upstream side of the GPF, the GPF desirably includes a catalyst with an oxygen storage capability.

"Temperature Increase Request"

The temperature increase request is not limited to that described in the above embodiments. For example, the temperature increase request may be made in a driving area where sulfur is easily accumulated in the three-way catalyst 24 (for example, an idling area). Additionally, as described in "Catalyst Undergoing Temperature Increase", when the internal combustion engine 10 including a GPF is controlled, the temperature increase request may be made by dither control to burn particulate material in the GPF.

"Controller"

The controller does not have to execute a software process and include the CPU 42 and the ROM 44. For example, the controller may include a dedicated hardware circuit (e.g., ASIC or the like) to execute at least part of the software process in the above embodiments. That is, the controller may have any one of the following configurations (A) to (C). (A) The controller includes a processing device, which executes all of the processes described above in accordance with programs, and a ROM or the like, which stores the programs. (B) The controller includes a processing device and a program storage device, which executes some of the processes described above in accordance with programs, and a dedicated hardware circuit, which executes the remaining processes. (C) The controller includes a dedicated hardware circuit that executes all of the above processes. There may be a plurality of software processing circuits, which include the processing device and the program storage device, and a plurality of dedicated hardware circuit. Thus, the processes described above may be executed by processing circuitry including at least either one or more software processing circuits or one or more dedicated hardware circuits. The program storage device, or computer readable medium, includes any applicable medium that is accessible by a versatile or dedicated computer.

"Internal Combustion Engine"

The internal combustion engine is not limited to a four-cylinder internal combustion engine. For example, the internal combustion engine may be a straight six-cylinder internal combustion engine. In addition, the internal combustion engine may be, for example, a V-type internal combustion engine including a first catalyst and a second catalyst that purify exhaust gas from different cylinders.

"Others"

The fuel injection valve is not limited to one that injects fuel into the combustion chamber 16, and for example, may be a fuel injection valve that injects fuel into the intake passage 12. It is not necessary to execute air-fuel ratio feedback control during dither control. The purge concentration Dp does not have to be calculated based on the feedback operation amount KAF. For example, the canister 36 may include a fuel concentration sensor, and the detection value of the fuel concentration sensor may be used.

Therefore, the present examples and embodiments are to be considered as illustrative and not restrictive and the invention is not to be limited to the details given herein, but may be modified within the scope and equivalence of the appended claims.

The invention claimed is:

1. A controller for an internal combustion engine, wherein the internal combustion engine includes a catalyst, configured to purify exhaust gas discharged from a plurality of cylinders, a plurality of fuel injection valves, respectively configured to supply fuel to the plurality of cylinders, a canister, configured to collect fuel vapor of fuel stored in a fuel tank, and an adjustment device, configured to adjust a flow rate of the fuel vapor collected by the canister flowing into an intake passage, the controller comprising:

processing circuitry configured to perform a dither control process on condition that a temperature increase request of the catalyst is made, wherein the dither control process includes operating the fuel injection valves so that one or more of the plurality of cylinders is a lean combustion cylinder in which an air-fuel ratio is leaner than a stoichiometric air-fuel ratio and another one or more of the plurality of cylinders is a rich combustion cylinder in which the air-fuel ratio is richer than the stoichiometric air-fuel ratio, and the processing circuitry further configured to perform
- a purge control process that operates the adjustment device to control a purge rate that is a value obtained by dividing a purge flow rate by an intake air flow rate, and
- a difference limiting process that limits and decreases a difference of the air-fuel ratio in the rich combustion cylinder and the air-fuel ratio in the lean combustion cylinder resulting from the dither control process on condition that the purge control process is controlling the flow rate of the fuel vapor at a value greater than zero.

2. The controller for an internal combustion engine according to claim 1, wherein the difference limiting process includes limiting the difference of the air-fuel ratio in the rich combustion cylinder and the air-fuel ratio in the lean combustion cylinder to decrease the difference on condition that a purge parameter, which is a parameter having a positive correlation with the purge rate, is greater than or equal to a threshold value.

3. The controller for an internal combustion engine according to claim 2, wherein the purge parameter is a value obtained by dividing the flow rate of the fuel vapor flowing into the intake passage from the canister by the intake air flow rate.

4. The controller for an internal combustion engine according to claim 1, wherein
the dither control process includes an amplitude setting process that sets the difference of the air-fuel ratio in the rich combustion cylinder and the air-fuel ratio in the lean combustion cylinder,
the difference limiting process includes performing an upper limit guard process on the set difference to limit the difference set by the amplitude setting process to less than or equal to an upper limit guard value, and
the dither control process is performed based on the difference that has undergone the upper limit guard process.

5. The controller for an internal combustion engine according to claim 4, wherein the difference limiting process includes variably setting the upper limit guard value in accordance with an operating point of the internal combustion engine.

6. A method for controlling an internal combustion engine, wherein the internal combustion engine includes a catalyst, configured to purify exhaust gas discharged from a plurality of cylinders, a plurality of fuel injection valves, respectively configured to supply fuel to the plurality of cylinders, a canister, configured to collect fuel vapor of fuel stored in a fuel tank, and an adjustment device, configured to adjust a flow rate of the fuel vapor collected by the canister flowing into an intake passage, the method comprising:
performing a dither control process on condition that a temperature increase request of the catalyst is made, wherein the dither control process includes operating the fuel injection valves so that one or more of the plurality of cylinders is a lean combustion cylinder in which an air-fuel ratio is leaner than a stoichiometric air-fuel ratio and another one or more of the plurality of cylinders is a rich combustion cylinder in which the air-fuel ratio is richer than the stoichiometric air-fuel ratio,
performing a purge control process that operates the adjustment device to control a purge rate that is a value obtained by dividing a purge flow rate by an intake air flow rate, and
performing a difference limiting process that limits and decreases a difference of the air-fuel ratio in the rich combustion cylinder and the air-fuel ratio in the lean combustion cylinder resulting from the dither control process on condition that the purge control process is controlling the flow rate of the fuel vapor at a value greater than zero.

\* \* \* \* \*